(12) United States Patent
Shani

(10) Patent No.: US 8,316,459 B2
(45) Date of Patent: Nov. 20, 2012

(54) SECURE TRANSFERENCE OF DATA BETWEEN REMOVABLE MEDIA AND A SECURITY SERVER

(75) Inventor: Yosi Shani, Ra'anana (IL)

(73) Assignee: Yazamtech Ltd., Ra'anana (IL)

( * ) Notice: Subject to any disclaimer, the term of this patent is extended or adjusted under 35 U.S.C. 154(b) by 576 days.

(21) Appl. No.: 12/629,087

(22) Filed: Dec. 2, 2009

(65) Prior Publication Data

US 2011/0131636 A1    Jun. 2, 2011

(51) Int. Cl.
     *G06F 21/00*      (2006.01)
(52) U.S. Cl. .......................... 726/30; 711/150; 713/167
(58) Field of Classification Search .......... 713/166–167; 726/26–30
See application file for complete search history.

(56) References Cited

U.S. PATENT DOCUMENTS 7,861,081 B2 * 12/2010 Yeap et al. .................... 713/167
2006/0058658 A1 * 3/2006 King et al. .................... 600/437
2007/0280211 A1 * 12/2007 Malueg et al. ................ 370/356

* cited by examiner

*Primary Examiner* — Philip Chea
*Assistant Examiner* — Kendall Dolly
(74) *Attorney, Agent, or Firm* — The Law Office of Michael E. Kondoudis

(57) ABSTRACT

A data processing system for securing information transfer from a removable media, comprising a security server and networked devices. Each networked device comprises a first operating system arranged to operate it; a second operating system, substantially differing structurally from the first operating system, and arranged to communicate with the security server over a secure communication link; and an I/O port arranged to allow connecting the removable device thereto. Each networked device is arranged to communicate with the removable device only via the second operating system responsive to the connection of the removable device to the port. The second operating system receives the information from the removable media via the I/O port and sends the information to the security server, which applies thereon operations relating to information security and in reference to predefined security criteria, such that the information is secure for use in the networked devices.

10 Claims, 4 Drawing Sheets

SECURE TRANSFERENCE OF DATA BETWEEN REMOVABLE MEDIA AND A SECURITY SERVER

BACKGROUND

1. Technical Field

The present invention relates to the field of data security, and more particularly, to securing a computer network in respect to insertion of infected information from removable media.

2. Discussion of Related Art

Network security is a crucial to the functioning of all computer networks. Security applications that are operated by a security server can not control information from removable media that are directly inserted to networked devices such as workstations due to their physical contact.

BRIEF SUMMARY

Embodiments of the present invention provide a data processing system for securing information transfer from a removable media, comprising: an security server; and a plurality of networked devices. Each networked device comprises a first basic operating system arranged to operate the networked device; a second operating system, substantially differing structurally from the first operating system, and arranged to communicate with the security server over a secure communication link; and an I/O (Input/Output) port arranged to allow connecting the removable device thereto. The networked device is arranged to communicate with the removable device only via the second operating system responsive to the connection of the removable device to the I/O port, while the first operating system is disabled from communicating with the I/O port. The second operating system is arranged to receive the information from the removable media via the I/O port and send the information to the security server. The security server is arranged to apply on the sent information a plurality of operations relating to information security and in reference to predefined security criteria, such that the information is secure for use in the networked devices.

Embodiments of the present invention provide a computer-implemented method of securing information transfer from a removable media to a plurality of networked devices, via the I/O port of one of the networked devices, each networked device having a first operating system arranged to operate the networked device. The computer-implemented method comprises: installing a second operating system in each networked device, the second operating system substantially differing structurally from the first operating system; configuring the networked device to communicate with the removable device via the second operating system responsive to connecting the removable device to the port; receiving, via the second operating system, the information from the removable media; sending the information via a secure communication link to an security server; and applying on the sent information security operations in reference to predefined security criteria.

Embodiments of the present invention provide a computer program product for securing information transfer from a removable media to a networked device via a port, the networked device having a first operating system arranged to operate the networked device, comprising a computer usable medium having computer usable program code tangibly embodied thereon. The computer usable program code comprises: computer usable program code for receiving information from the removable media via the port, comprising a second operating system that is substantially different structurally from the first operating system; computer usable program code for configuring the networked device to communicate with the removable device via the second operating system responsive to connecting the removable device to the port; computer usable program code for sending the information via a secure communication link to an security server; and computer usable program code for applying on the sent information security operations in reference to predefined security criteria.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
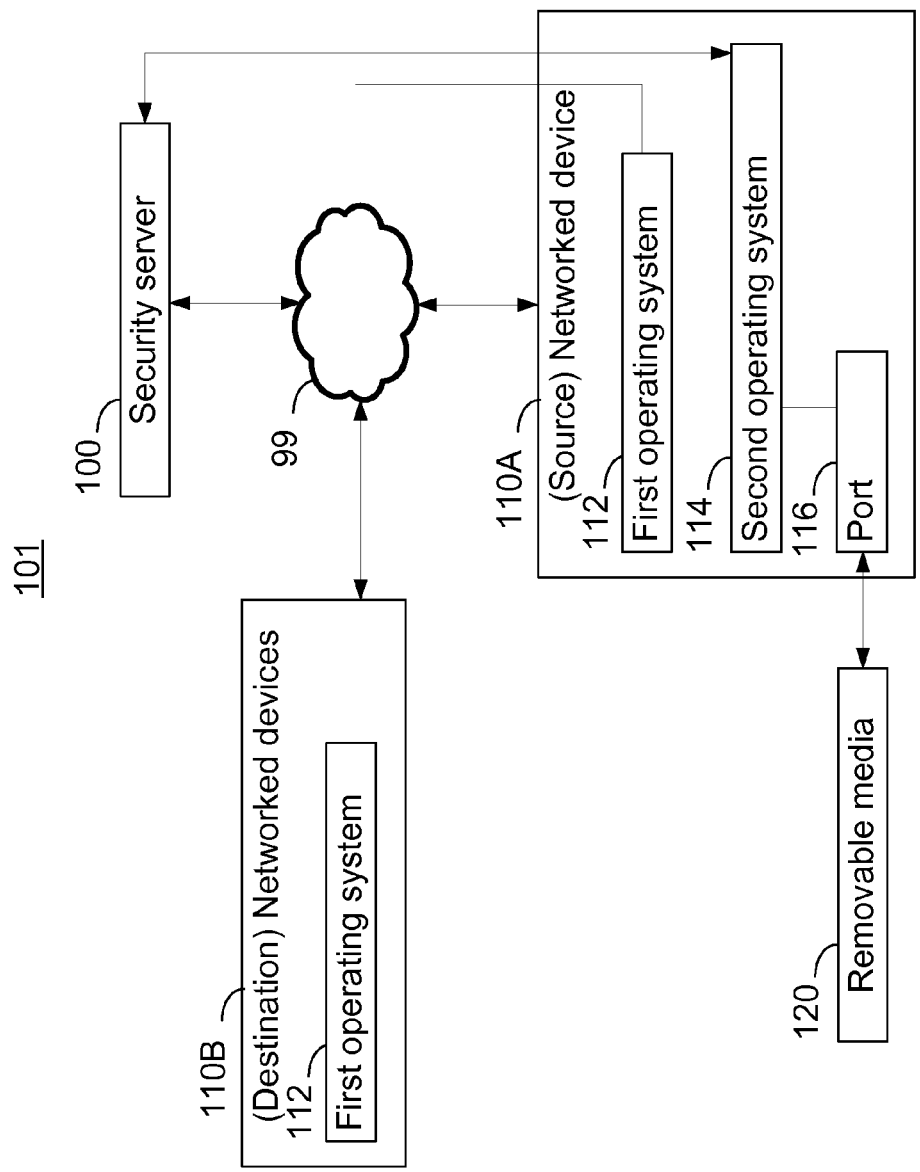
FIGS. 1 and 2 are high level schematic block diagrams of a data processing system for securing information transfer from a removable media, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner: The term "networked device" as used herein in this application, is defined as any device in a network, for example computers or servers connected in any type of network, for example a company network or the Internet. Networked devices may comprise server dealing with either incoming data or outgoing data.

Figure 2:
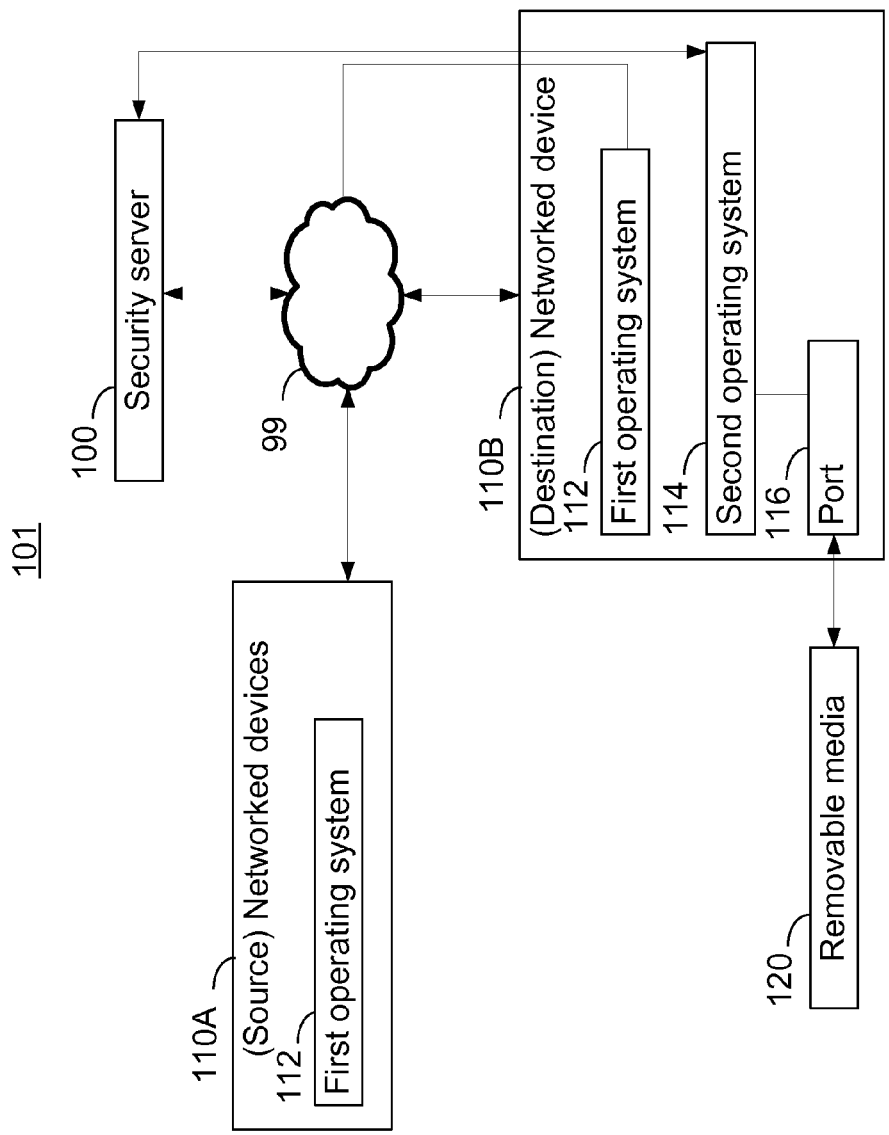

FIGS. 1 and 2 are high level schematic block diagrams of a data processing system 101 for securing information transfer from and to a removable media 120, according to some embodiments of the invention. Data processing system 101 comprises an security server 100 and a plurality of networked devices 110. Each networked device 110 comprises a first basic operating system 112 arranged to operate networked device 110, such as the indigenous operating system of networked device 110 as well as a second operating system 114, substantially differing structurally from first operating system 112 (e.g., second operating system 114 being LINUX while first operating system 112 being WINDOWS), and arranged to communicate with security server 100 over a secure communication link 99 (e.g., with a secure communication protocol such as HTTPS, SFTP). Removable media 120 may connected to networked device 110 via an I/O (Input/Output) port 116 arranged to allow connecting removable device 120 thereto. Networked device 110 is arranged to communicate with removable device 120 via second operating system 114 only, while first operating system 112 is disabled from communicating with I/O port 116, and responsive to the connection of removable device 120 to I/O port 116. I/O port 116 may communicate solely with second operating system 114, and is blocked from access from any other elements within networked device 110 or other networked devices 110. Blocking may be carried out by system capabilities or from external resources.

As illustrated in FIG. 1, second operating system 114 is arranged to receive the information from removable media 120 via I/O port 116 and send the information securely to security server 100, that is arranged to apply on the sent information a plurality of operations relating to information security and in reference to predefined security criteria, such that the information is secure for use in any networked devices 110 in the network.

As illustrated in FIG. 2, second operating system 114 is arranged to receive information securely from security server 100 and send the information to removable media 120 via I/O port 116. Security server 100 is arranged to apply on the information a plurality of operations relating to information security and in reference to predefined security criteria, such that the information is allowable for use outside the network. Security server 100 may receive the information from any networked devices 110 in the network.

According to some embodiments of the invention, examples for operations relating to information security are, for incoming information: blocking of executable files, removing hostile code such as viruses, removing macros, removing hidden information, removing images according to specified criteria, cleaning FLASH files, and for outgoing information: removing properties, allowing specified file types only, removing or changing hidden information, or removing images according to specified criteria.

In these ways, networked devices 110 are protected from potentially malicious software on inserted removable media 120, and yet may use and interact with allowable software and content from removable media 120, as approved by security server 100.

Security server 100 is arranged to protect a network by being the only network element that handles external sources such as removable media 120. Thus, any external information is immediately directed to security server 100 avoiding any interaction with device or network components. Security server 100 is arranged to check incoming information and generate a secure version thereof for use by all network components and networked devices 110. The same operation is applied for outgoing information, wherein all outgoing information is passed to security server 100 before reaching external media such as removable media 120. Outgoing information is checked and processed by security server 100 to generate a version that is allowable to exit the network. This version is then transferred by security server 100 to removable media 120 exclusively via second operating system 114.

According to some embodiments of the invention, security server 100 may change or filter software code and content from removable media 120 such as to avoid damage to networked devices 110 and other servers in the network therefrom. Security server 100 may be arranged to generate a secure version of the information by the application of the operations thereupon, and send the secure version to first operating system 112 of at least one of networked devices 110.

According to some embodiments of the invention, security server 100 may also control or filter outgoing information. Security server 100 may be arranged to receive information from first operating system 112 of at least one of networked devices 110, apply a plurality of data security operations thereupon, thereby generating a secure version thereof, and send the secure version to removable media 120 via second operating system 114 of the corresponding networked device 110. The secure version may comprise inserted information and may be devoid of erased information. Insertions and erasures may be determined according to predefined rules.

According to some embodiments of the invention, there is provided a computer program product for securing information transfer from removable media 120 to networked device 110 via I/O port 116. The computer program product comprises a computer usable medium having computer usable program code tangibly embodied thereon. The computer usable program code comprises: computer usable program code for receiving information from removable media 120 via I/O port 116, comprising second operating system 114 that is substantially different structurally from first operating system 112; computer usable program code for configuring networked device 110 to communicate with removable device 120 via second operating system 114 responsive to connecting removable device 120 to port 116; computer usable program code for sending the information via secure communication link 99 to security server 100; and computer usable program code for applying on the sent information security operations in reference to predefined security criteria.

According to some embodiments of the invention, the computer usable program code may further comprise computer usable program code for generating a secure version of the information by the application of the security operations thereupon, and computer usable program code for distributing the secure version in a network.

According to some embodiments of the invention, the computer usable program code may further comprise computer usable program code for receiving information from first operating system 112 of networked device 110; computer usable program code for applying a plurality of data security operations upon the information received from first operating system 112, thereby generating a secure version thereof; and computer usable program code for sending the secure version to removable media 120 via second operating system 114 of networked device 110.

Figure 3A:
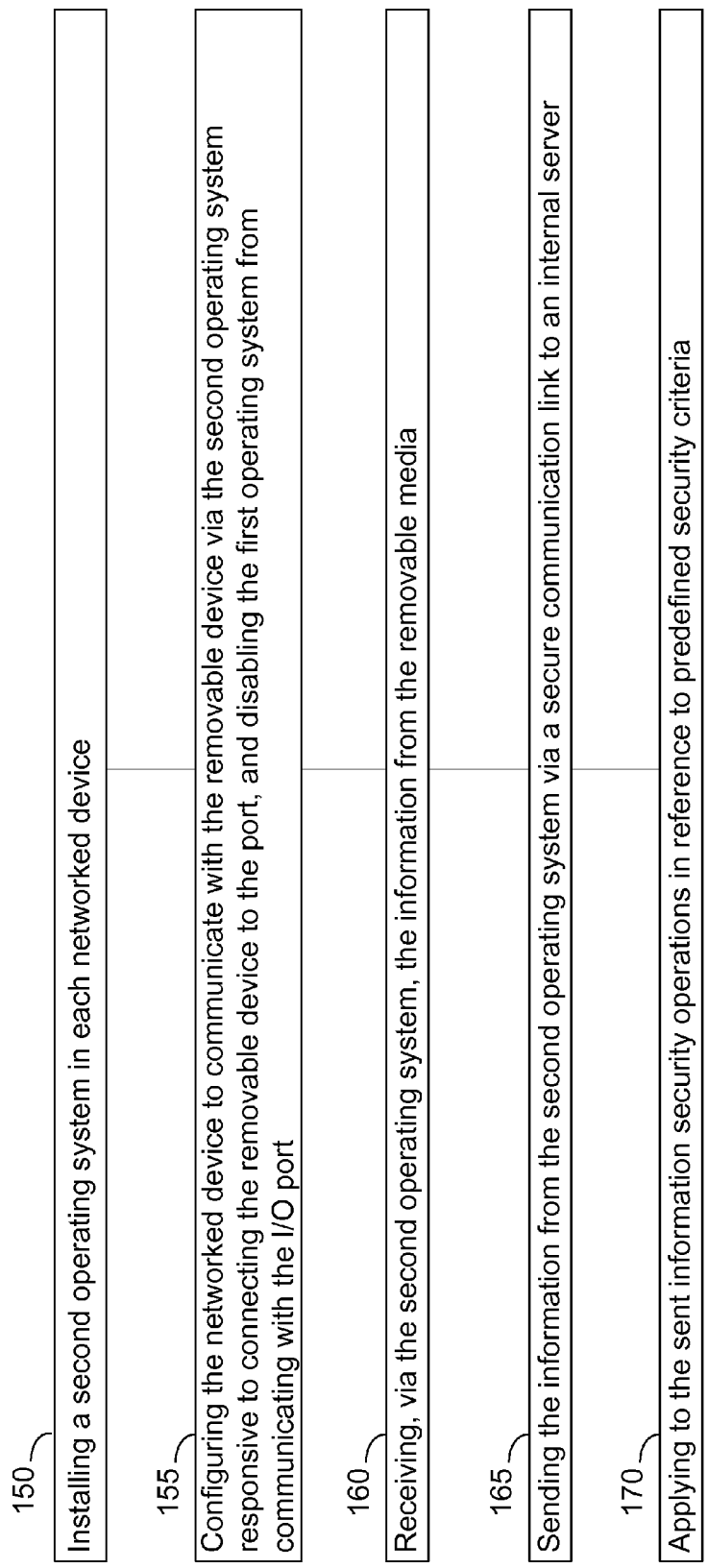
FIGS. 3A and 3B are high level flowcharts illustrating a computer-implemented method of securing information transfer according to some embodiments of the invention.
Figure 3B:
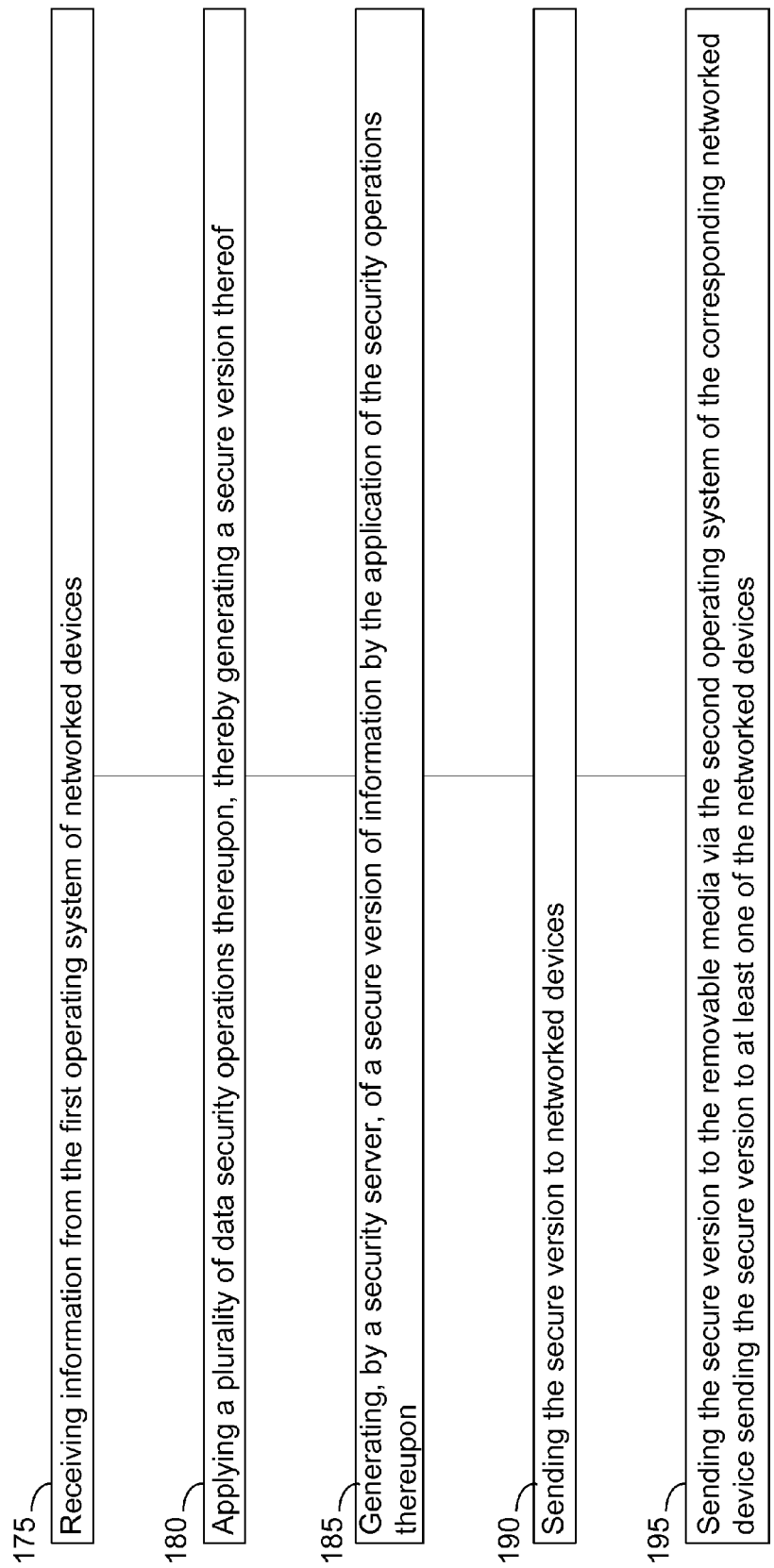

FIGS. 3A and 3B are high level flowcharts illustrating a computer-implemented method of securing information transfer according to some embodiments of the invention. The computer-implemented method secures information transfer from a removable media to a plurality of networked devices, via an I/O port of one of the networked devices. Each networked device has a first operating system arranged to operate the networked device. The computer-implemented method comprises the following stages (FIG. 3A): installing a second operating system in each networked device, the second operating system substantially differing structurally from the first operating system (stage 150); configuring the networked device to communicate with the removable device via the second operating system responsive to connecting the removable device to the I/O port, and disabling the first operating system from communicating with the I/O port (stage 155); receiving, via the second operating system, the information from the removable media (stage 160); sending the information via a secure communication link to an security server (stage 165); and applying on the sent information security operations in reference to predefined security criteria (stage 170).

According to some embodiments of the invention, the computer-implemented method (FIG. 3B) may comprise the following stages: receiving information from the first operating system of at least one of the networked devices (stage 175); applying a plurality of data security operations thereupon, thereby generating a secure version thereof (stage 180); generating, by the security server, of a secure version of the information by the application of the security operations thereupon (stage 185); sending the secure version to at least one of the networked devices (stage 190); and sending the secure version to the removable media via the second operating system of the corresponding networked device (stage 195).

According to some embodiments of the invention, the application of security operations (stage 170) may comprise erasing information, and/or inserting information, as well as applying various markings and encryptions on parts of the information.

Advantageously, the systems and methods allow using the networked devices in a secure manner in respect to the removable media, without necessitating use of specialized workstation for information transfer, without endangering the networked devices or other servers in the network. The systems and methods allow transferring and receiving information in a secure manner among any group of devices in the virtual world.

Advantageously, the systems and methods do not require approval and regulation processes for removable media and no need to characterize them prior to the actual use. However, the control of the security definitions and application is kept at a global level and is not carried out on the networked devices locally.

During normal operation of the networked device, the I/O ports are fully blocked from the first operating system. A switching module may control the activation of the second operating system and keep a fluent transition between the first and the second operating system. Each second operating system in each networked device may be uniquely identified by the security server, e.g., by using a digital signature, such as to allow the security server to identify networked devices with an operable second operating system.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A data processing system for securing information transfer from a removable media, comprising:
   a security server; and
   a plurality of networked devices, each comprising:
   a first operating system arranged to operate the networked device;

a second operating system arranged to communicate with the security server over a secure communication link;

an I/O port arranged to allow connecting the removable device thereto, wherein the networked device is arranged to communicate with the removable device via the second operating system responsive to the connection of the removable device to the I/O port, while the first operating system is disabled from communicating with the I/O port, wherein the second operating system is arranged to receive the information from the removable media via the I/O port and send the information to the security server, and wherein the security server is arranged to apply on the sent information a plurality of operations relating to information security and in reference to predefined security criteria, such that the information is secure for use in the networked devices, and wherein the security server is arranged to receive information from the first operating system of at least one of the networked devices, to apply a plurality of data security operations thereupon, thereby generating a secure version thereof, and to send the secure version to the removable media via the second operating system of the corresponding networked device.

2. The data processing system of claim 1, wherein the security server is arranged to generate a secure version of the information by the application of the operations thereupon.

3. The data processing system of claim 2, wherein the security server is arranged to send the secure version to the first operating system of at least one of the networked devices.

4. The data processing system of claim 1 wherein the secure version comprises inserted information and is devoid of erased information.

5. A computer-implemented method of securing information transfer from a removable media to a plurality of networked devices, via an I/O port of one of the networked devices, each networked device having a first operating system arranged to operate the networked device, the computer-implemented method comprising:

installing a second operating system in each networked device, configuring the networked device to communicate with the removable device via the second operating system responsive to connecting the removable device to the I/O port and disabling the first operating system from communicating with the I/O port;

receiving, via the second operating system, the information from the removable media;

sending the information via a secure communication link to a security server;

receiving information from the first operating system of at least one of the networked devices;

generating, by the security server, a secure version of the information by applying a plurality of the security operations thereupon in reference to predefined security criteria;

sending the secure version to at least one of a corresponding networked devices;

sending the secure version to the removable media via the second operating system of the corresponding networked device.

6. The computer-implemented method of claim 5, wherein the application of security operations comprises at least one of: erasing information, and inserting information.

7. The computer-implemented method of claim 5, wherein the application of security operations comprises at least one of: erasing information, and inserting information.

8. A computer program product for securing information transfer from a removable media to a networked device via a port, the networked device having a first operating system arranged to operate the networked device, comprising a non-transitory computer readable medium having computer usable program code tangibly embodied thereon, the computer usable program code comprising:

computer usable program code for receiving information from the removable media via the port, computer usable program code for configuring the networked device to communicate with the removable device via the second operating system responsive to connecting the removable device to the port;

computer usable program code for sending the information via a secure communication link to an security server, computer usable program code for receiving information from the first operating system of the networked device;

computer usable program code for applying a plurality of data security operations upon the information received from the first operating system, thereby generating a secure version of the information; and computer usable program code for sending the secure version to the removable media via the second operating system of the networked device.

9. The computer program product of claim 8, wherein the computer usable program code further comprises computer usable program code for generating a secure version of the information by the application of the security operations thereupon.

10. The computer program product of claim 9, wherein the computer usable program code further comprises computer usable program code for distributing the secure version in a network.

* * * * *